July 14, 1936.  J. R. PLASTERS  2,047,834
FISH STRINGER
Filed Jan. 16, 1935
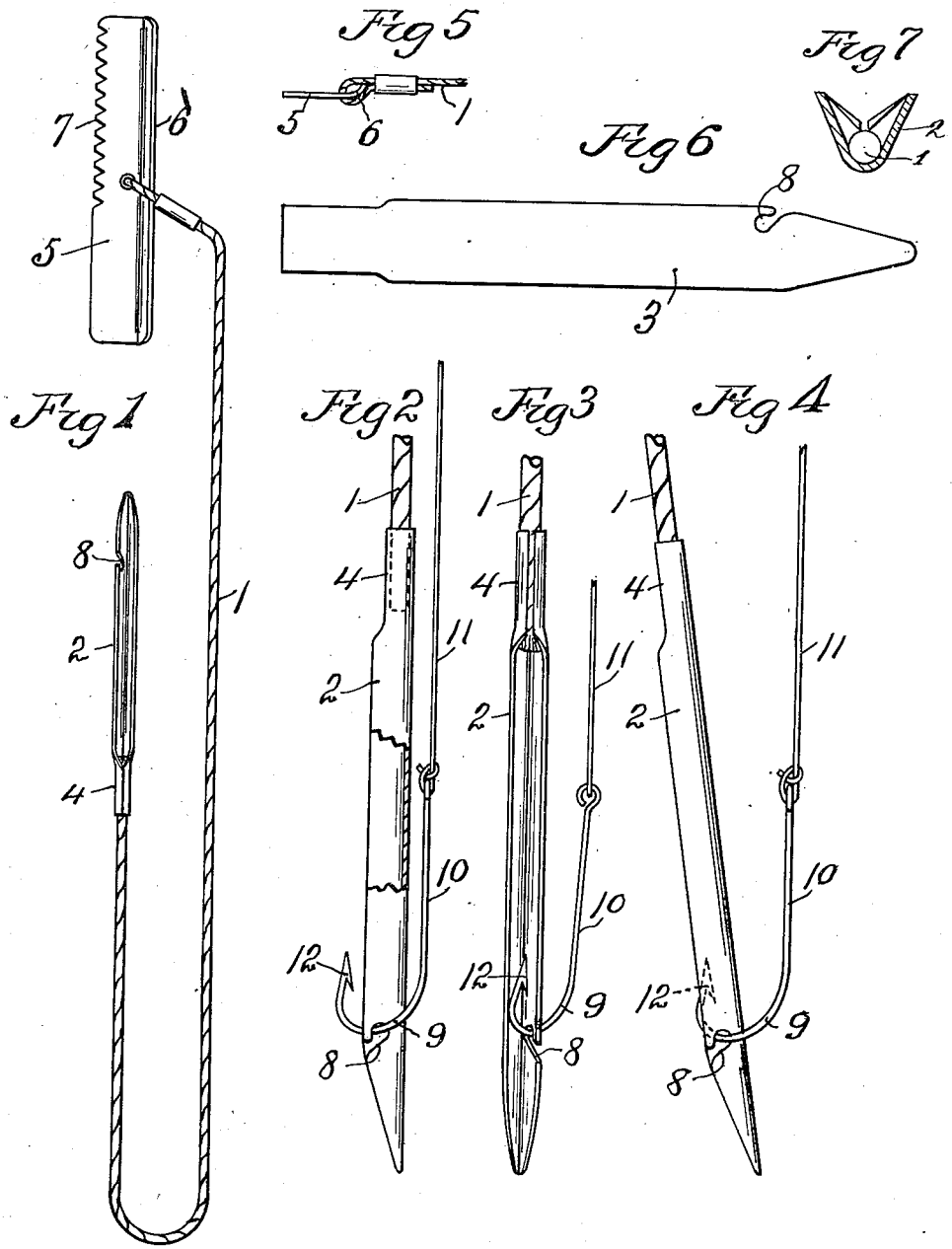
INVENTOR
James R. Plasters
BY Warren D. House
His ATTORNEY Patented July 14, 1936

2,047,834

UNITED STATES PATENT OFFICE 2,047,834

FISH STRINGER

James R. Plasters, Kansas City, Mo.

Application January 16, 1935, Serial No. 2,036

2 Claims. (Cl. 224—7)

My invention relates to improvements in fish stringers.

One object of my invention is to provide a fish stringer of a type having a stringing line one end of which is fastened to a novel impaling needle, which is provided with means for engaging and assisting in the disgorging of a fishhook which has its barbed end portion embedded in a fish.

A further object of my invention is the provision of a novel fish stringer needle, which is stiff, cheap to make and which has novel means for attachment to a fish stringer line.

Still another object of my invention is the provision of a novel fish retaining member attached to the other end of the fish stringer line, and which has means adapting it for use in scaling fish.

Another object of my invention is to provide in one implement a fish stringer, fishhook disgorging means, and fish scaling means.

The novel features of my invention are hereinafter fully described and claimed.

In the accompanying drawing, which illustrates my improved fish stringer,

Fig. 1 is a plan view of my improved fish stringer.

Fig. 2 is an enlarged side elevation, partly broken away, of my improved fish stringer needle shown engaged with the bowed portion of a fishhook which is to be disgorged, the needle being shown attached to an end portion of a stringing line.

Fig. 3 is a view similar to Fig. 2 looking at another side of the needle.

Fig. 4 is a view similar to Fig. 2, showing the barbed end portion of the fishhook disposed in the channel of the needle, the fishhook having been released from impaling engagement with the fish, and in position for withdrawal from the fish.

Fig. 5 is an end view of the fish retaining and scaling member, shown attached to an end portion of the stringing line.

Fig. 6 is an enlarged plan view of the blank from which the stringing needle may be formed.

Fig. 7 is a cross section of the stringing needle.

Similar reference characters designate similar parts in the different views.

1 designates an ordinary fish stringing line, which may be of any flexible material ordinarily used for such purpose, as a cord, a chain, a wire or a cable. To one end of the stringing line 1 is attached my improved stringing and disgorging needle 2, preferably formed from the sheet metal blank 3 (Fig. 6) into channel form having for most of its length a V shaped cross section, the front end being pointed for easy impaling purposes, and the rear end portion 4 being tubular and made to tightly embrace one end of the stringing line 1.

To the other end of the stringing line 1 is attached near its middle a fish retaining member comprising, as shown, a plate 5 having a longitudinal flange 6 along one edge, the other longitudinal edge having serrations 7 along a portion of its length, whereby the plate 5 may be used for scaling fish. The longitudinal flange 6 enables the user to firmly and securely hold the plate 5 when it is used for scaling.

For disgorging hooks from the mouths or throats of fish in which the hooks have become so firmly attached as to be difficult to remove, one wall of the stringing needle 2 has a transverse slot 8 extending inwardly and rearwardly from its longitudinal edge portion, said slot 8 being adapted to receive the bow shaped portion 9 of an ordinary fishhook 10, as shown in Figs. 2 and 3. As best shown in Figs. 2 and 6, the slot 8 preferably extends rearwardly a distance as great or greater than the width of the narrowest part of the slot, with the edge of the slot next to said longitudinal edge portion being for a substantial distance non-divergent rearwardly therefrom.

In using the needle 2 for disgorging a fishhook embedded in the mouth or throat of a fish, the fishing line 11, which is attached to the fishhook shank 10, is held taut and the needle 2 is slid along the shank 10 until the bow shaped portion 9 of the fishhook enters the slot 8, as shown in Figs. 2 and 3.

The needle 2 is then twisted and pushed downwardly, while the line 11 is held taut, until the barbed end 12 of the fishhook is released from holding engagement with the flesh, following which the needle is turned until the barbed end 12 registers with the channel of the needle, at which time the rear end of the needle 2 is swung away from the line 11, so as to cause the barbed end 12 to enter the needle channel, as shown in Fig. 4. By now withdrawing the needle 2 and the fishing line 11, the fishhook may be removed from the fish without liability of the barbed end 12 reengaging the flesh of the fish.

By making the needle 2 of sheet material of channel form, it is stiffer and less liable to be bent than a needle of solid cylindrical form having the same weight of material.

By having the slit 8 extend inwardly and rearwardly from the longitudinal edge of the wall of the channel, the hook is not liable to become accidentally released from the needle, when the latter is being operated to detach the hook, as the fishing line 11 being held taut, holds the bowed portion 9 of the fishhook tightly against the rear or upper end of the slot. If the slot 8 extended horizontally or inwardly and downwardly from the longitudinal edge of the channel wall, the hook would be liable to become disengaged from the needle. By having the slot 8 extending rearwardly a distance as great as the width of the narrowest part of the slot, and with the edge of the slot next to the longitudinal edge portion of the wall being for a substantial distance non-divergent rearwardly from said edge portion, when the needle is twisted axially to release the fishhook from the flesh of the fish, there is no liability of the fishhook being forced out of the slot and thus disengaged from the needle.

Many modifications of my invention, within the scope of the appended claims, may be made without departing from the spirit of my invention.

What I claim is:—

1. In a fish stringer, a stringing line, and a needle attached to said line, and having a longitudinal channel, one of the side walls of said channel having in its longitudinal edge a slot extending inwardly and then rearwardly for a substantial distance and adapted to receive the bowed portion of a fishhook the barbed end of which is adapted to be inserted into said channel when said portion is in said slot.

2. A fish stringing needle adapted to have one end attached to a stringing line and having a longitudinal channel extending in one side from its other end, one of the side walls of said channel having in its longitudinal edge portion a slot extending inwardly and then rearwardly with its edge next to said edge portion being for a substantial distance non-divergent rearwardly therefrom.

JAMES R. PLASTERS.